(12) United States Patent
Schorr et al.

(10) Patent No.: US 11,175,115 B2
(45) Date of Patent: Nov. 16, 2021

(54) DETERMINATION OF GUIDED-MUNITION ROLL ORIENTATION

(71) Applicant: BAE Systems Information and Electronic Systems Integration Inc., Nashua, NH (US)

(72) Inventors: David J. Schorr, Austin, TX (US); Jason H. Batchelder, Lyndeborough, NH (US); Jeremy B. Gibson, Bedford, NH (US); James H. Steenson, Jr., Hudson, NH (US); Joseph D. Vasile, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 197 days.

(21) Appl. No.: 16/467,357

(22) PCT Filed: Jan. 5, 2017

(86) PCT No.: PCT/US2017/012290
§ 371 (c)(1),
(2) Date: Jun. 6, 2019

(87) PCT Pub. No.: WO2018/128612
PCT Pub. Date: Jul. 12, 2018

(65) Prior Publication Data
US 2020/0096291 A1   Mar. 26, 2020

(51) Int. Cl.
*F41G 7/36* (2006.01)
*F41G 7/22* (2006.01)
(Continued)

(52) U.S. Cl.
CPC ............... *F41G 7/36* (2013.01); *F41G 7/222* (2013.01); *F41G 7/2213* (2013.01); *F41G 9/00* (2013.01);
(Continued)

(58) Field of Classification Search
CPC .......... F41G 7/36; F41G 7/222; F41G 7/2213; F42B 15/01; F42B 15/08
See application file for complete search history.

(56) References Cited

U.S. PATENT DOCUMENTS 4,641,801 A    2/1987 Lynch, Jr. et al.
6,138,944 A *  10/2000 McCowan ............... F41G 7/26
                                                    244/3.1
(Continued)

FOREIGN PATENT DOCUMENTS

EP   2960743 A2   12/2015
WO   2015128610 A1   9/2015

OTHER PUBLICATIONS

EP Search Report, EP17890325.8, dated Jul. 15, 2020, 8 pages.
(Continued)

*Primary Examiner* — Marcus E Windrich
(74) *Attorney, Agent, or Firm* — Scott J. Asmus; Finch & Maloney PLLC

(57) ABSTRACT

Techniques are provided for determination of a guided-munition orientation during flight based on lateral acceleration, velocity, and turn rate of the guided-munition. A methodology implementing the techniques, according to an embodiment, includes obtaining a lateral acceleration vector measurement and a velocity of the guided-munition, and calculating a ratio of the two, to generate an estimated lateral turn vector of the guided-munition. The method also includes integrating the estimated lateral turn vector, over a period of time associated with flight of the guided-munition,
(Continued)

to generate a first type of predicted attitude change. The method further includes obtaining and integrating a lateral turn rate vector measurement of the guided-munition, over the period of time associated with flight of the guided-munition, to generate a second type of predicted attitude change. The method further includes calculating a gravity direction vector based on a difference between the first and second types of predicted attitude change.

17 Claims, 8 Drawing Sheets

(51) Int. Cl.
　　*F41G 9/00*　　(2006.01)
　　*F42B 15/01*　　(2006.01)
　　*F42B 15/08*　　(2006.01)
　　*G05D 1/10*　　(2006.01)
　　*G01C 19/00*　　(2013.01)
(52) U.S. Cl.
　　CPC .............. *F42B 15/01* (2013.01); *F42B 15/08* (2013.01); *G05D 1/108* (2013.01); *G01C 19/00* (2013.01)

(56) References Cited

U.S. PATENT DOCUMENTS

| | | | |
|---|---|---|---|
| 8,275,544 B1 | 9/2012 | Wells et al. | |
| 2012/0256038 A1* | 10/2012 | Elwell, Jr. | F42B 15/01 244/3.2 |
| 2013/0092785 A1* | 4/2013 | Tournes | F41G 7/2213 244/3.2 |
| 2013/0173207 A1 | 7/2013 | Tanenhaus | |
| 2014/0306055 A1* | 10/2014 | Brohede | F41G 7/305 244/3.21 |
| 2016/0349026 A1* | 12/2016 | Fairfax | F41G 7/006 |
| 2017/0300047 A1* | 10/2017 | Kolanek | F41G 7/306 |
| 2018/0094903 A1* | 4/2018 | DeJong | F41G 7/346 |
| 2018/0164076 A1* | 6/2018 | Steenson, Jr. | F42C 17/04 |

OTHER PUBLICATIONS

Massey et al. "A System-of-System Design of a Guided Projectile Mortar Defense System". In: 24th AIAA Applied Aerodynamics Conference. Jun. 8, 2006. Retrieved from <https://smartech.gatech.edu/bitstream/handle/1853/25235/Ender_2006.1.pdf> entire document.

International Search Report, PCT/US2017/012290, dated Mar. 23, 2017, 38 pages.

* cited by examiner

DETERMINATION OF GUIDED-MUNITION ROLL ORIENTATION

FIELD OF DISCLOSURE

The present disclosure relates to determination of a rocket or guided-munition roll orientation, and more particularly, to determination of a rocket roll orientation based on measurements of the lateral acceleration and the lateral turn rate of the rocket in flight.

BACKGROUND

It is generally useful to be able to determine the roll orientation of a rocket or guided munition during flight. Knowledge of the roll orientation, which can be specified with respect to a downward or gravity pointing direction, allows a guidance system to maneuver or otherwise control the trajectory of the rocket. Estimating the roll orientation, however, is complicated by the fact that the initial roll orientation at time of launch is an unknown or random variable, and the rocket is typically spinning at a rate of 10 to 30 hertz during the boost and initialization stages after launch. Unfortunately, existing methods to estimate rocket roll orientation require that the rocket not perform any maneuvers while data is collected for the estimation process, which can typically take anywhere from 5 to 10 seconds. The use of such methods, therefore, prevents the rocket from engaging targets, particularly at short and intermediate ranges, until the orientation estimation is completed.

SUMMARY

One example embodiment of the present disclosure provides a processor-implemented method for determination of a guided-munition roll orientation. The method includes calculating a ratio of a lateral acceleration vector measurement of the guided munition to a velocity of the guided munition, to generate an estimated lateral turn rate vector of the guided munition. The method also includes integrating the estimated lateral turn rate vector, over a period of time associated with flight of the guided munition, to generate a first type of predicted attitude change. The method further includes obtaining a lateral turn rate vector measurement of the guided munition; and integrating the measured lateral turn rate vector, over the period of time associated with flight of the guided munition, to generate a second type of predicted attitude change. The method further includes calculating a gravity direction vector based on a difference between the first type of predicted attitude change and the second type of predicted attitude change.

Another example embodiment of the present disclosure provides a system for determination of a guided-munition roll orientation. The system includes an accelerometer configured to measure a lateral acceleration vector of the guided munition. The system also includes a vector division circuit configured to calculate a ratio of the lateral acceleration vector measurement to a velocity of the guided munition, to generate an estimated lateral turn rate vector of the guided munition. The system further includes a temporal integration circuit configured to integrate the estimated lateral turn rate vector, over a period of time associated with flight of the guided munition, to generate a first type of predicted attitude change. The system further includes a lateral turn rate sensor configured to measure a lateral turn rate vector of the guided munition. The temporal integration circuit is further configured to integrate the measured lateral turn rate vector, over the period of time associated with flight of the guided munition, to generate a second type of predicted attitude change. The system further includes a vector subtraction circuit to calculate a gravity direction vector based on a difference between the first type of predicted attitude change and the second type of predicted attitude change.

Yet another example embodiment of the present disclosure provides computer readable storage medium having instructions encoded thereon that, when executed by one or more processors, result in operations for determination of a guided-munition roll orientation. The operations include calculating a ratio of a lateral acceleration vector measurement of the guided munition to a velocity of the guided munition, to generate an estimated lateral turn rate vector of the guided munition. The operations also include integrating the estimated lateral turn rate vector, over a period of time associated with flight of the guided munition, to generate a first type of predicted attitude change. The operations further include obtaining a lateral turn rate vector measurement of the guided munition; and integrating the measured lateral turn rate vector, over the period of time associated with flight of the guided munition, to generate a second type of predicted attitude change. The operations further include calculating a gravity direction vector based on a difference between the first type of predicted attitude change and the second type of predicted attitude change.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
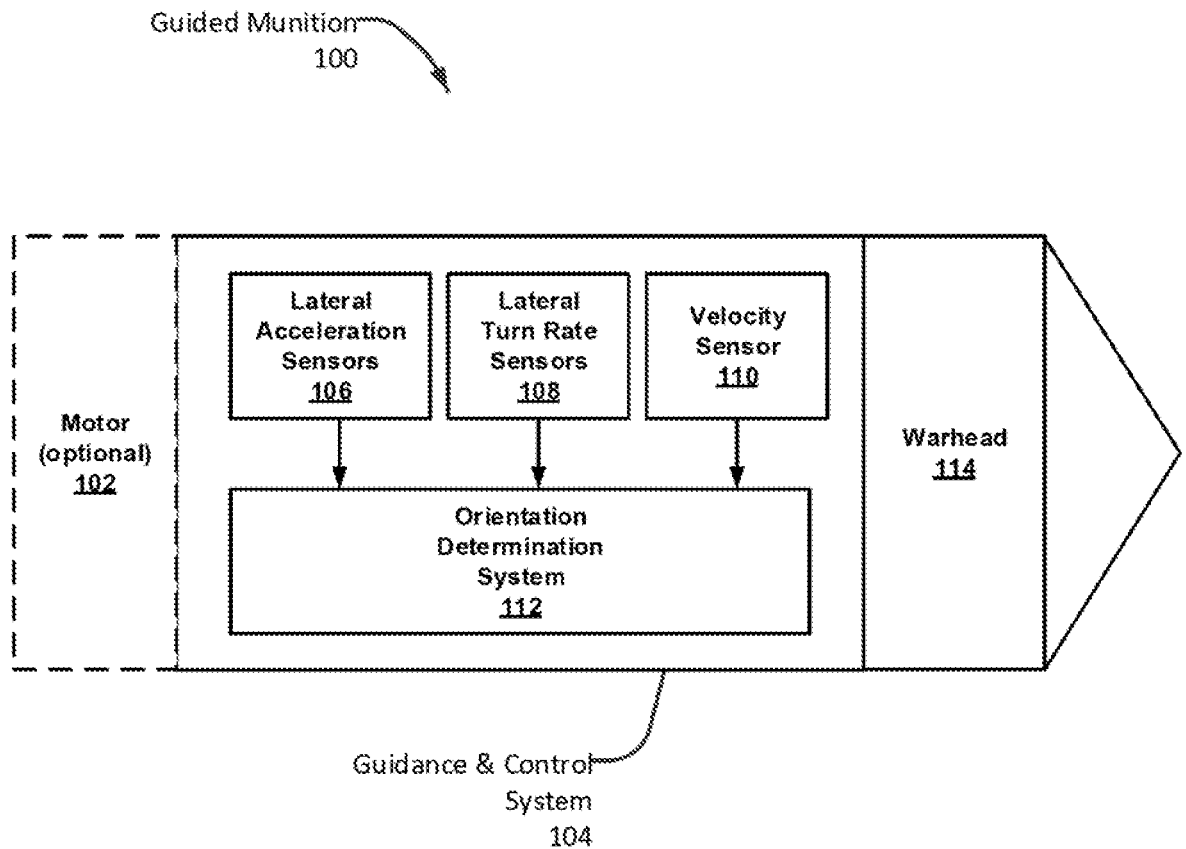
FIG. 1 illustrates certain components of a rocket, including a rocket orientation determination system, configured in accordance with certain of the embodiments disclosed herein.

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for determination of the roll orientation of a rocket during flight based on measurements of the lateral acceleration, velocity, and turn rate of the rocket. In some embodiments, the velocity may be based on a stored velocity profile for the rocket, rather than a velocity measurement. The techniques can be executed on-board the rocket. The term "roll orientation," as used herein refers to, in addition to its plain and ordinary meaning, the orientation of the rocket along its longitudinal axis with respect to the direction of the force of gravity. In other words, knowledge of the roll orientation provides an indication, for the rocket, of which direction is up or down. This information enables, or improves, the capabilities of a guidance system to maneuver or otherwise control the trajectory of the rocket. It should be understood that the use of the term rocket herein is intended to include and cover any form of precision guided munition. Thus, for example, once the rocket orientation is known, that orientation can be provided to the guidance/control system of the rocket and used for trajectory shaping and execution of rocket maneuvers, such as turning the rocket towards ground and controlling a terminal flight path angle of the guided munition.

In accordance with an embodiment, the disclosed techniques can be implemented, for example, in a computing system or a software product executable or otherwise controllable by such systems. The computing system can be on-board the rocket or have communications to an external computing system. The system or product is configured to obtain multiple vector measurements of the lateral acceleration and velocity of the rocket over time, and to calculate a ratio of the lateral acceleration and velocity, to generate estimated turn rates of the rocket. The system is also configured to integrate the estimated turn rates, over a period of time associated with flight of the rocket, to generate a first type of estimated attitude change. The system is further configured to obtain and integrate lateral turn rate vector measurements of the rocket, over the period of time associated with flight of the rocket, to generate a second type of predicted attitude change. The system is still further configured to calculate a gravity direction vector based on a difference between the first and second types of predicted attitude change. In some embodiments, the system is also configured to provide the calculated gravity direction vector, or an associated ground-pointing orientation angle, to a guidance and control circuit of the rocket to facilitate the execution of rocket maneuvers.

As will be appreciated in light of this disclosure, the techniques provided herein may provide for determination of a rocket orientation, with continuous or periodic updated estimates of improving accuracy, during the course of rocket flight. Additionally, the disclosed techniques, in contrast to existing methods, do not impose any limitations on the maneuverability of the rocket during the orientation determination process, thus allowing the rocket to engage short and medium range targets. The disclosed techniques can also be implemented with reduced complexity in an efficient manner, employing relatively low cost components including accelerometers, turn rate sensors, and relatively simple processing circuitry. Additionally, at least some portions of these techniques can be implemented in hardware or software or a combination thereof.

FIG. 1 illustrates components of a guided-munition 100, configured in accordance with certain of the embodiments disclosed herein. The guided munition, rocket or missile 100 is shown to include a motor 102 (optional), guidance and control system 104, and warhead 114. In some embodiments, the guided munition may be an artillery round, glide munition, or guided bomb, in which case the motor 102 may not be present. The guidance and control system 104 is shown to further include an orientation determination system 112, lateral acceleration sensors 106, lateral turn rate sensors 108, and a velocity sensor 110. The motor 102, if present, contains fuel that is ignited at launch and burns until consumed to provide propulsion for the rocket which causes the rocket to undergo acceleration. The guidance and control system 104, which generally, but not necessarily, sits atop the motor section, also includes control circuitry and related components (not shown) which are configured to guide the rocket towards an intended target. The warhead 114, which is generally, but not necessarily, affixed to the top of the rocket assembly, provides the explosives.

The orientation determination system 112 is generally on-board the rocket. In some embodiments, the orientation determination system 112 may be integrated into the guidance & control system 104, and is configured to provide updated estimates of the rocket orientation (e.g., with respect to a downward or gravity pointing direction), during flight. In other embodiments, the orientation determination system 112 is implemented separately from the guidance & control system 104, but communicatively coupled to the guidance & control system 104. In any such cases, the orientation determination is based on measurements of the rocket's lateral acceleration, velocity, and turn rate, as will be described in greater detail below. Once the rocket orientation is known, that orientation can be provided to the guidance & control system 104 and used for trajectory shaping and execution of rocket maneuvers, such as turning the rocket towards ground and controlling a terminal flight path angle of the guided munition to an intended target.

Figure 2:
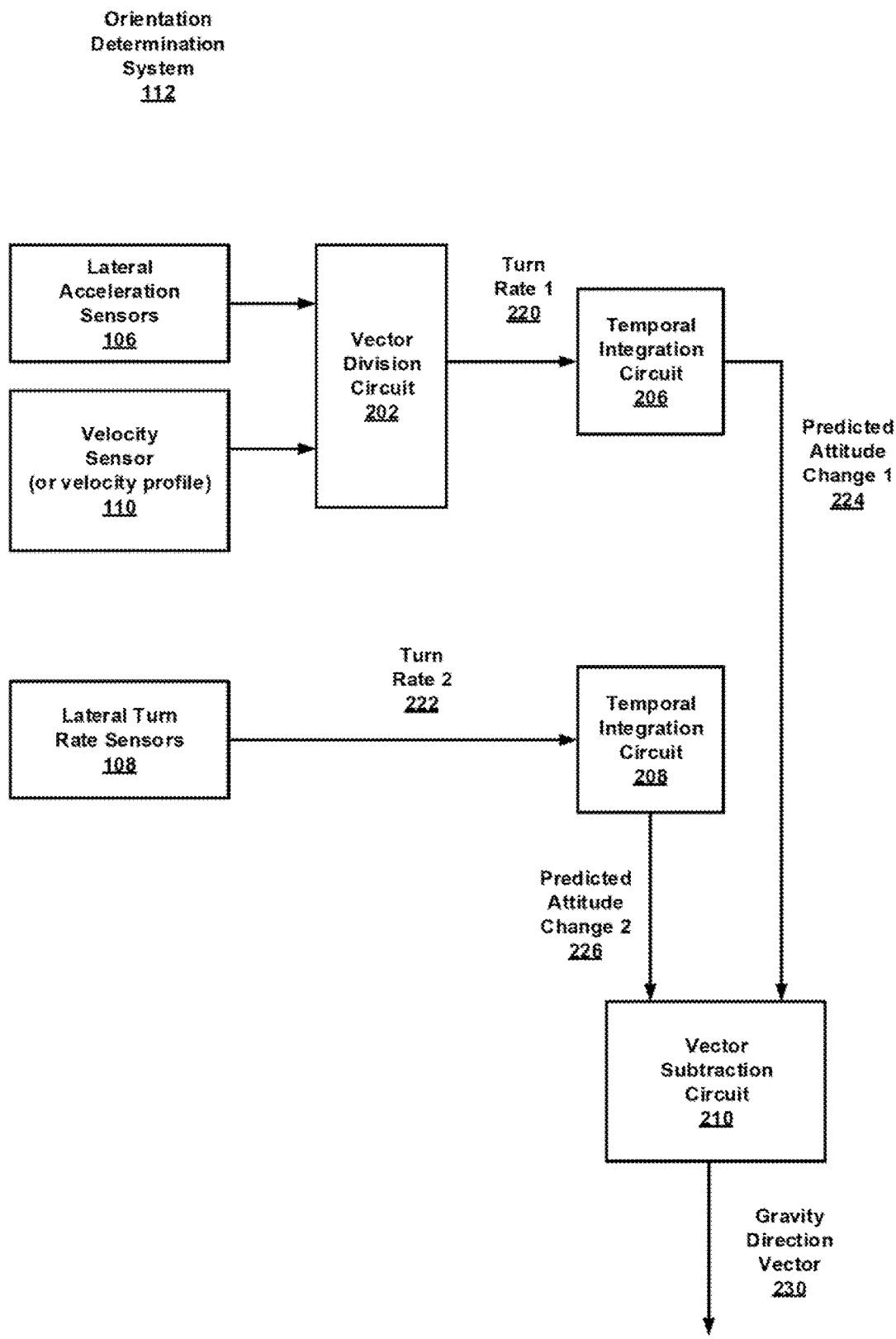
FIG. 2 is a more detailed block diagram of a rocket orientation determination system, configured in accordance with certain of the embodiments disclosed herein.

FIG. 2 is a more detailed block diagram of a rocket orientation determination system 112, which is one element of the guidance and control system 104 and is configured in accordance with certain of the embodiments disclosed herein. The rocket orientation determination system 112 in this example is shown to include lateral acceleration sensors 106, velocity sensor 110, vector division circuit 202, lateral turn rate sensors 108, temporal integration circuits 206, 208, and vector subtraction circuit 210. It will be appreciated that in some embodiments, other components and sensors may also be included for additional applications.

Figure 3:
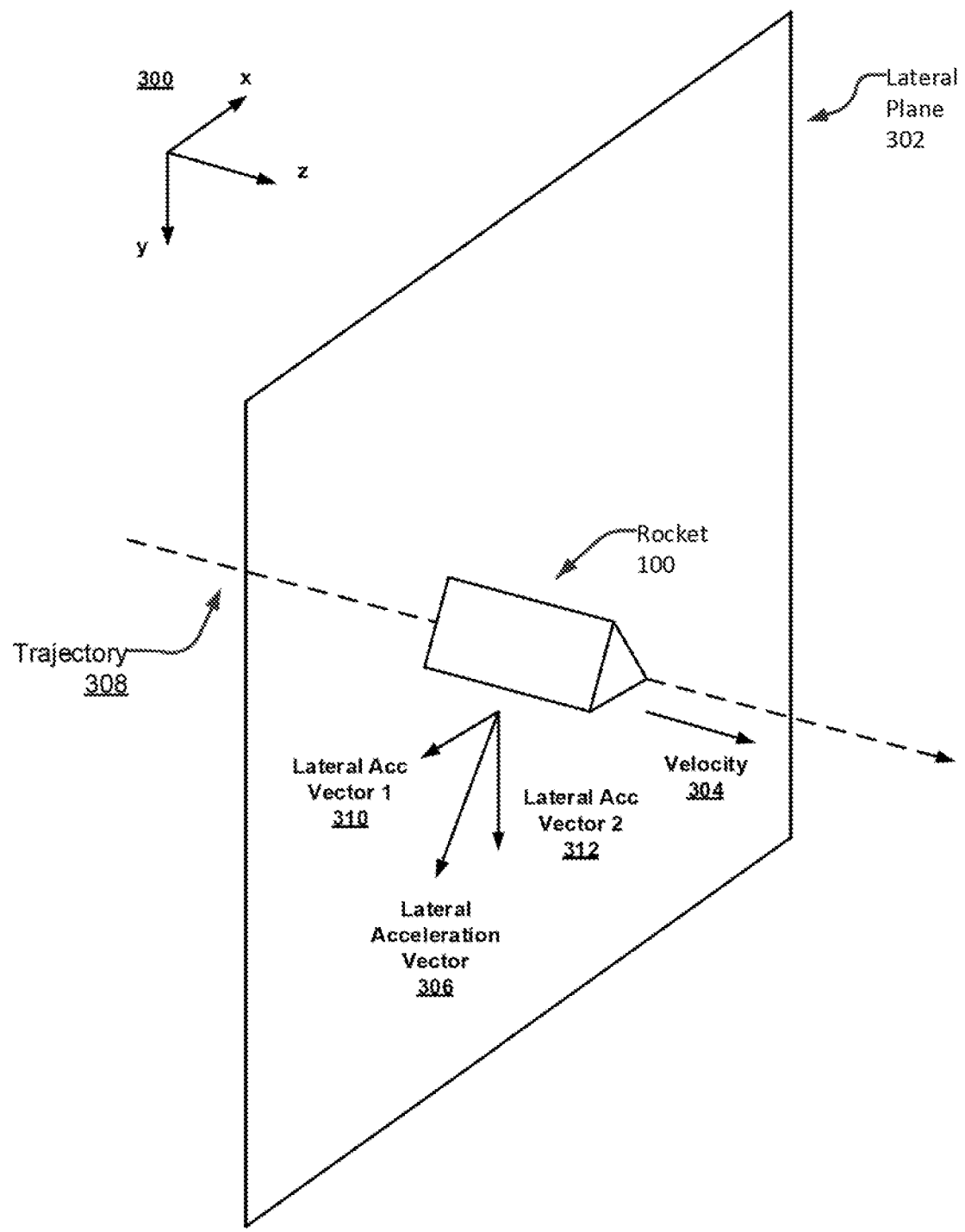
FIG. 3 illustrates lateral acceleration and velocity vectors associated with a rocket flight path, in accordance with certain of the embodiments disclosed herein.

The lateral acceleration sensors 106 are configured to provide a measurement of the vector component of the acceleration of the rocket in a lateral plane of the rocket. The lateral plane of the rocket is a two-dimensional plane that is orthogonal to the longitudinal axis (e.g., the centerline) of the rocket. This is illustrated in FIG. 3 and explained in greater detail below. In some embodiments, the lateral acceleration sensors include two acceleration sensors, each configured to provide an orthogonal component of the lateral acceleration vector in the lateral plane. The lateral acceleration vector may thus be calculated as the vector sum of the data provided by the first turn lateral acceleration sensor and the second lateral acceleration sensor.

The velocity sensor 110 is configured to provide a measurement of the velocity vector of the rocket. Successive measurements of lateral acceleration and velocity may be obtained over time during the flight of the rocket. In some embodiments, a velocity sensor may be unavailable, in which case a velocity estimate may be based upon a velocity profile stored in the memory (e.g., in the guidance and control module). The velocity profile may be a table, or other form of database, containing typical velocity values versus time for the rocket.

The vector division circuit 202 is configured to calculate a ratio of the lateral acceleration vector measurement to the velocity vector measurement, for example at each sample time, to generate an estimated turn rate 220 of the rocket at the corresponding sample time. The temporal integration circuit 206 is configured to integrate the estimated turn rates 220, over a period of time associated with the flight of the rocket, to generate and update a "first type" of predicted attitude change 224. For example, an initial integration from time t=0 seconds to time t=5 seconds (e.g., from launch to 5 seconds after launch) may provide an initial estimate of the predicted attitude change (of the "first type"). Subsequently, continuing the integration through to time t=10 seconds provides an improved estimate. In some embodiments, the integration may be performed over any desired time period between launch and impact. In some embodiments, the integration may be performed in a continuous manner producing continuously updated estimates of the predicted attitude change 224 (of the "first type").

Figure 4:
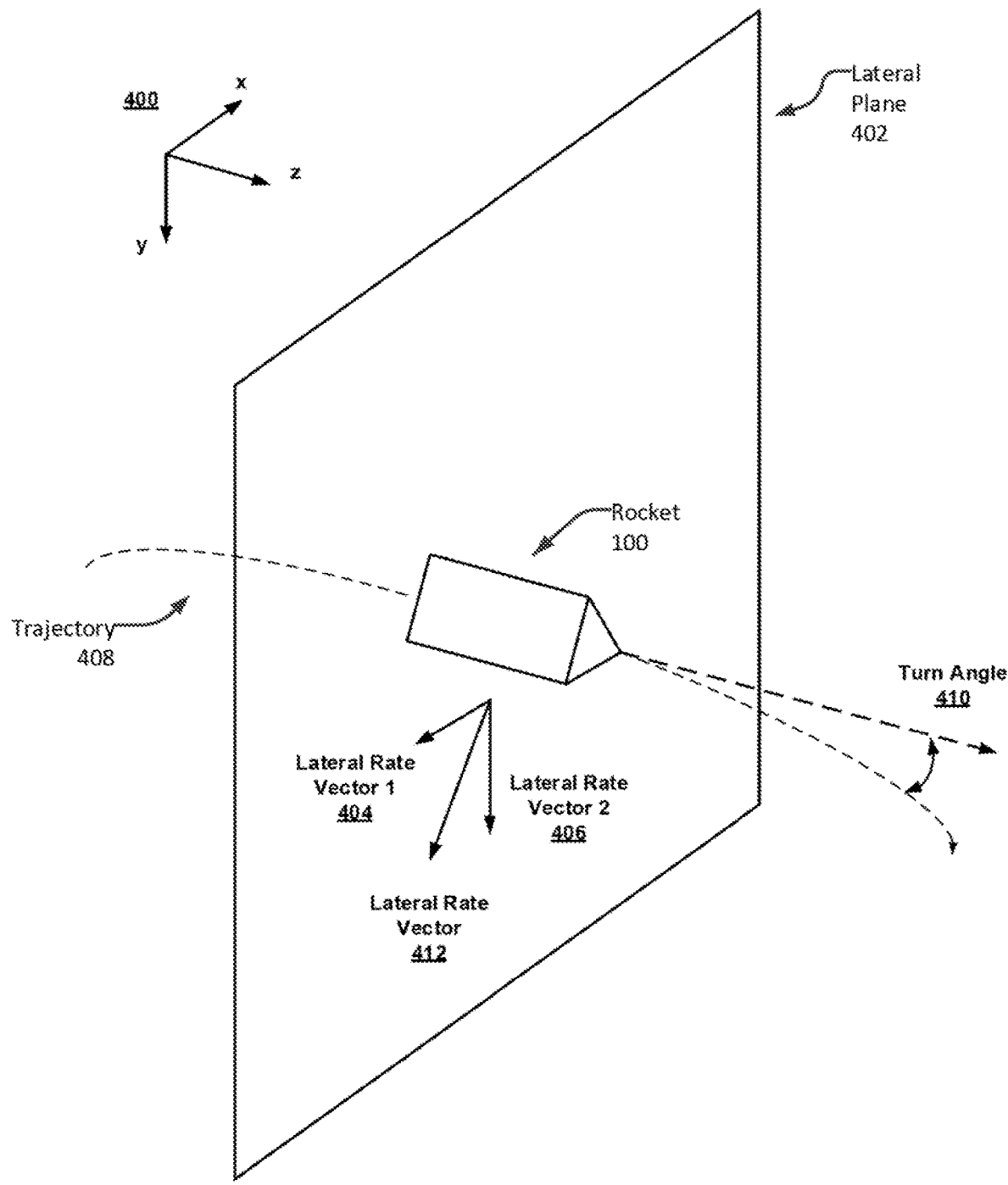
FIG. 4 illustrates lateral turn rate vectors associated with a rocket flight path, in accordance with certain of the embodiments disclosed herein.

The lateral turn rate sensors 108 are configured to provide a measurement of the lateral turn rate vector 222 of the rocket. The turn rate vector of the rocket indicates the change in turn angle and direction (e.g., in degrees per second) of the rocket. The lateral turn rate vector 222 is the vector component of this turn rate vector which lies in the lateral plane, as illustrated in FIG. 4 and explained in greater detail below. In some embodiments, the lateral turn rate sensors include gyroscopes or Micro-Electro-Mechanical Systems (MEMS) rate sensors. In some embodiments, the lateral turn rate sensors include two turn rate sensors, each configured to provide an orthogonal component of the turn rate vector in the lateral plane. The lateral turn rate vector may thus be calculated as the vector sum of the data provided by the first turn rate sensor and the second turn rate sensor.

The temporal integration circuit 208 is configured to integrate the lateral turn rate vector measurements 222, over the period of time associated with the flight of the rocket, to generate a "second type" of predicted attitude change 226. The operation of temporal integration circuit 208 is similar to that of circuit 206, as described above, and in some embodiments, temporal integration circuit 208 and temporal integration circuit 206 may be a common or shared circuit. For example, an initial integration from time t=0 seconds to time t=5 seconds (e.g., from launch to 5 seconds after launch) may provide an initial estimate of the predicted attitude change (of the "second type"). Subsequently, continuing the integration through to time t=10 seconds provides an improved estimate, and the integration may be performed over any desired time period between launch and impact, including a continuous integration producing continuously updated estimates of the predicted attitude change 226 (of the "second type").

Figure 5:
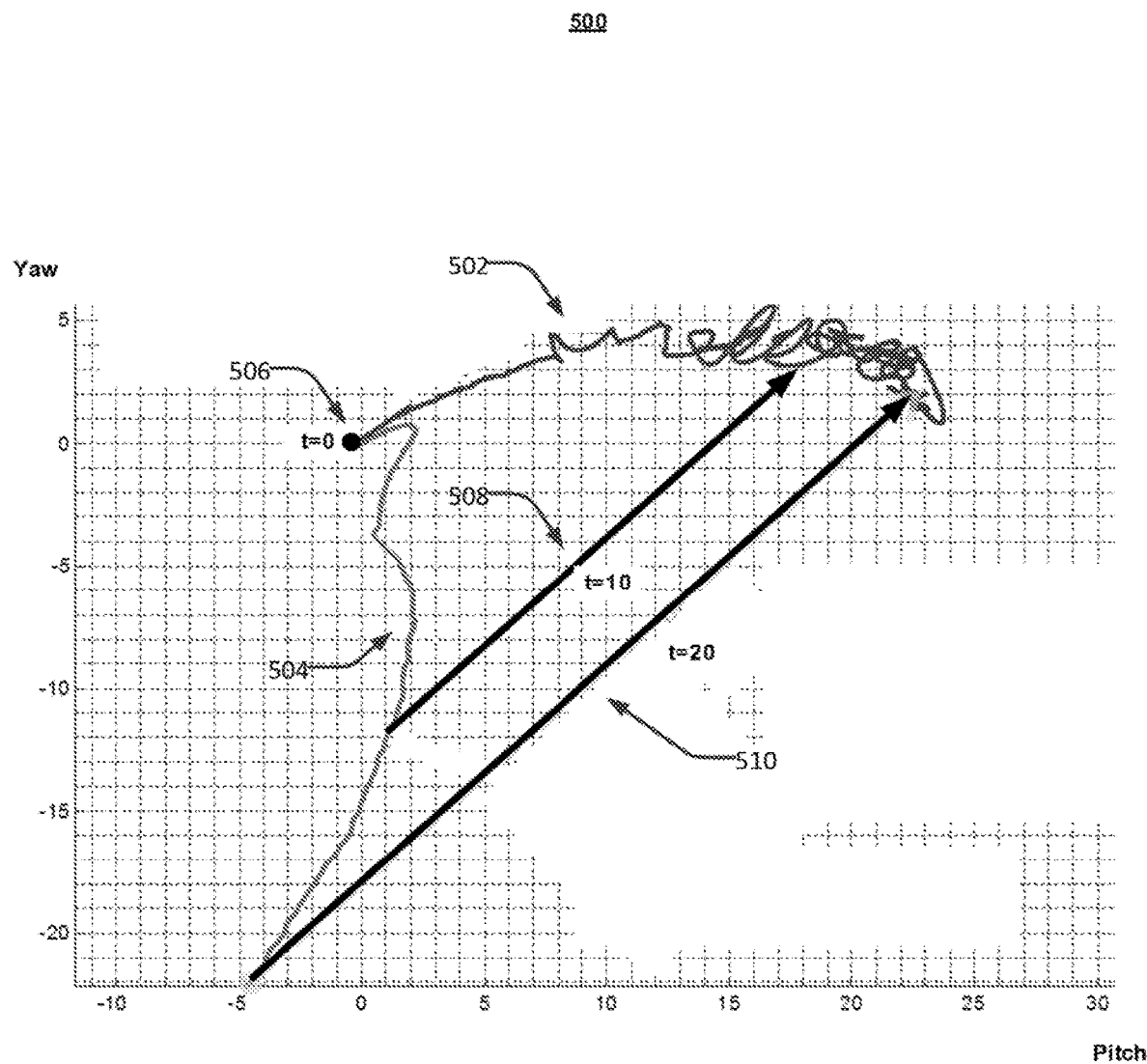
FIG. 5 illustrates a plot of the calculated gravity direction vector over time, in accordance with certain of the embodiments disclosed herein.
Figure 6:
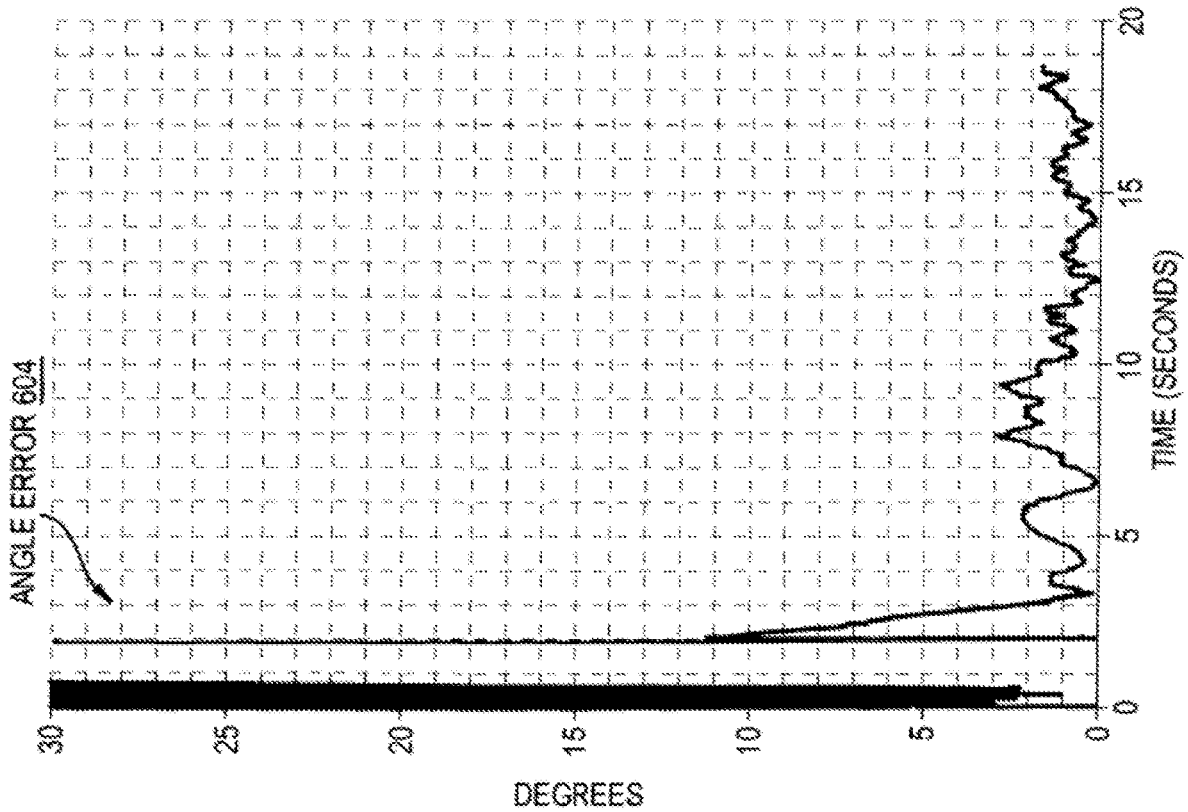
FIG. 6 illustrates related plots of the calculated gravity direction angle and error over time, in accordance with certain of the embodiments disclosed herein.
Figure 6:
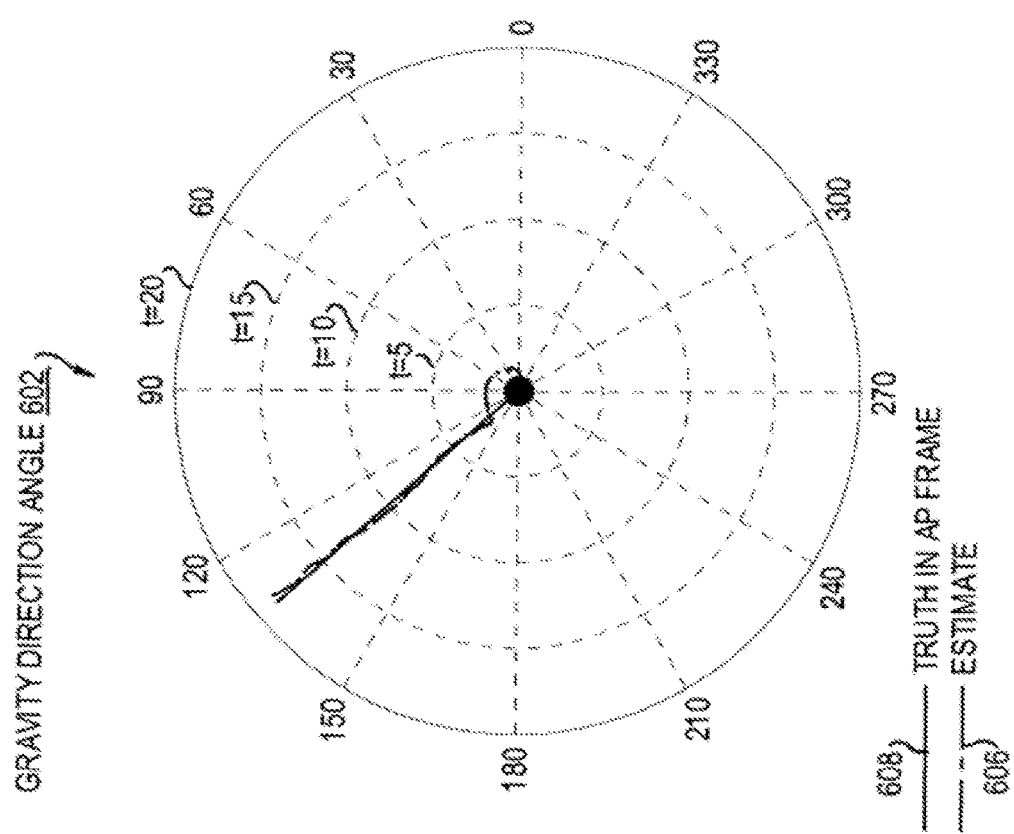

The vector subtraction circuit 210 is configured to calculate a gravity direction vector as the vector difference between the first type of predicted attitude change 224 and the second type of predicted attitude change 226 (e.g., over any given integration time). This is illustrated in FIGS. 5 and 6, and described in greater detail below. A ground-pointing orientation angle may also be calculated based on the gravity direction vector (e.g., the phase of the vector).

The system 112 is further configured to provide the gravity direction vector (and/or ground-pointing orientation angle) to the guidance and control circuit of the rocket to enable execution of rocket maneuvers. The rocket maneuvers may include, for example, turning the rocket towards ground after launch from an aircraft or other launch platform once the rocket has achieved sufficient altitude, or otherwise controlling the terminal flight path angle of the rocket towards impact to achieve the greatest destruction and smallest ground impact footprint. The rocket may thus maneuver, or otherwise control the airframe, to engage a target at decreased range, while the orientation estimate is being calculated and/or refined. Additionally, such maneuvers may allow for shaping of the rocket's vertical trajectory to extend the maximum range of the rocket.

FIG. 3 illustrates lateral acceleration and velocity vectors associated with a rocket flight path, in accordance with certain of the embodiments disclosed herein. The rocket 100 is shown traveling along a trajectory 308 in an inertial reference frame 300 described, for example, by orthogonal axes x, y, and z. The rocket trajectory may begin with a launch from a platform, such as, for example, a fixed wing or rotary wing aircraft, and continue towards an intended target. The rocket 100 may be undergoing acceleration that can be described, in general, by a 3-dimensional vector.

The lateral acceleration vector 306 is the 2-dimensional component of the rocket's acceleration vector which lies in the lateral plane 302 (e.g., along the x and y axes). The lateral plane 302 is the plane that is orthogonal to the longitudinal axis (e.g., the centerline) of the rocket. The lateral acceleration vector 306 may be decomposed into orthogonal vector components 310 and 312, for example along the x-axis and y-axis directions, each of which may be measured by a separate sensor, according to an embodiment. The velocity vector 304 of the rocket is also shown. This vector specifies the speed and direction of the rocket.

FIG. 4 illustrates lateral turn rate vectors associated with a rocket flight path, in accordance with certain of the embodiments disclosed herein. The rocket 100 is shown traveling along a trajectory 408 in an inertial reference frame 400 described, for example, by orthogonal axes x, y, and z. The rocket 100 may be performing a maneuver that results in a change in direction. The rate of change in direction (e.g., of turn angle 410) can be described, in general, by a 3-dimensional turn rate vector. The lateral turn rate vector 412 is the 2-dimensional component of the rocket's turn rate vector which lies in the lateral plane 402 (e.g., along the x and y axes). The lateral plane 402, as previously described, is the plane that is orthogonal to the longitudinal axis (e.g., the centerline) of the rocket. The lateral turn rate vector 412 may be decomposed into orthogonal vector components 404 and 406, for example along the x-axis and y-axis directions, each of which may be measured by a separate sensor or gyroscope, according to an embodiment.

FIG. 5 illustrates a plot 500 of the calculated gravity direction vector over time, in accordance with certain of the embodiments disclosed herein. The predicted attitude change, based on the turn rate measurement, is shown as plot 502 over an example rocket flight time from t=0 seconds to t=20 seconds, in terms of yaw and pitch angles. The corresponding predicted attitude change, based on the lateral acceleration measurement, is shown as plot 504 over the same time period. The resulting estimated gravity direction vectors are also shown at time t=10 seconds (vector 508) and time t=20 seconds (vector 510). As can be seen from these plots, the magnitude of the difference between the two predicted attitude changes 502 and 504 increases over time in a relatively consistent direction, and the accuracy improves as the magnitude increases.

FIG. 6 illustrates plots of example calculated gravity direction angle 602 and error 604, over time, in accordance with certain of the embodiments disclosed herein. The estimated 606 and actual (or true) 608 gravity directions are shown in a polar plot 602 on the left, where concentric rings indicate the time from zero seconds at the origin to 20 seconds at the outermost ring. As can be seen, the estimate converges to the true value, of approximately 135 degrees, after a few seconds. This can also be seen in the related angle error plot 604 on the right, which shows that the error estimate decreases to less than five degrees before 5 seconds of flight time has elapsed.

Methodology

Figure 7:
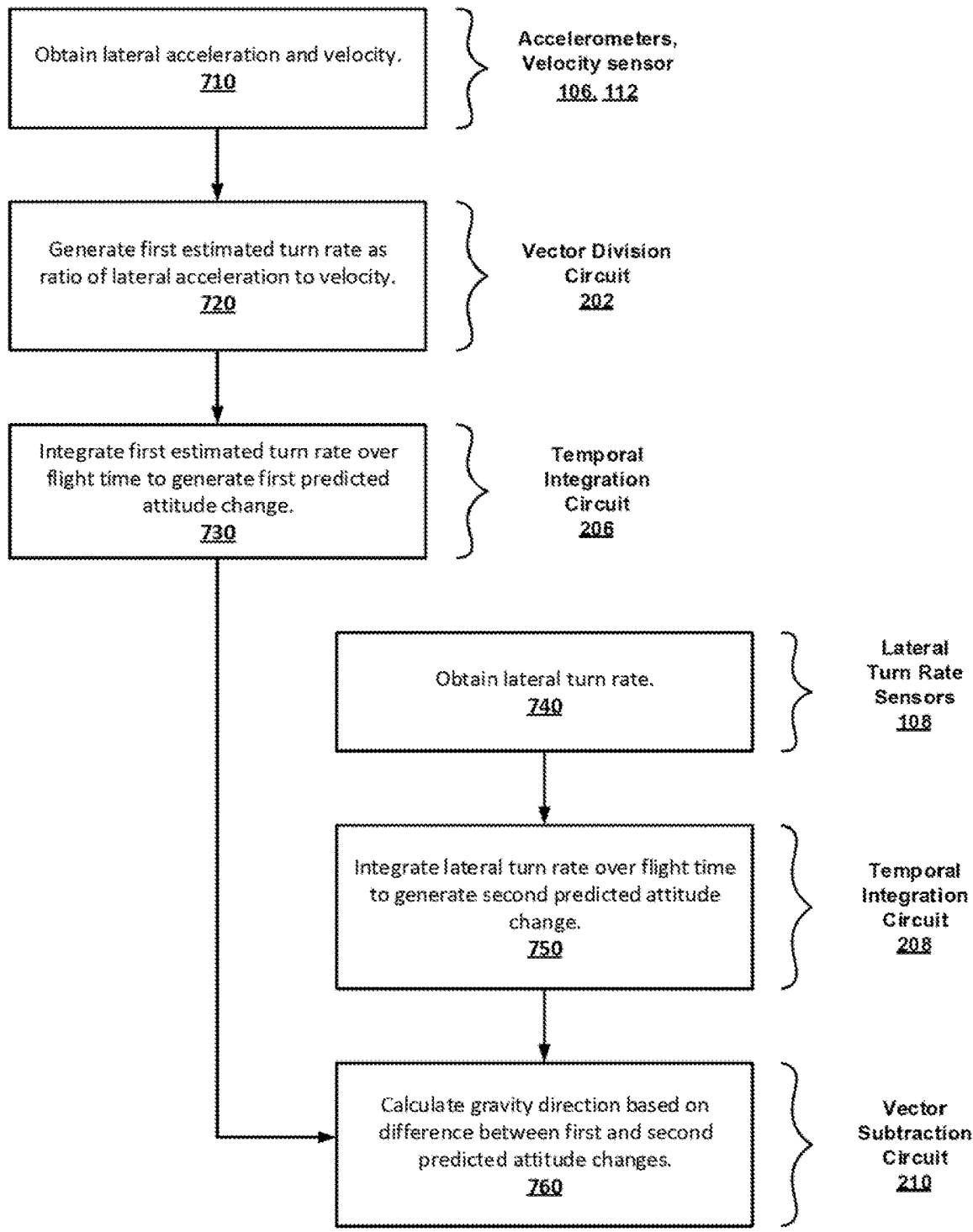
FIG. 7 is a flowchart illustrating a methodology for determination of a rocket orientation, in accordance with certain of the embodiments disclosed herein.

FIG. 7 is a flowchart illustrating an example method 700 for determination of a rocket orientation, in accordance with an embodiment of the present disclosure. As can be seen, example method 700 includes a number of phases and sub-processes, the sequence of which may vary from one embodiment to another. However, when considered in the aggregate, these phases and sub-processes form a process for automated rocket orientation determination in accordance with certain of the embodiments disclosed herein. These embodiments can be implemented, for example using the system architecture illustrated in FIG. 2 as described above. However other system architectures can be used in other embodiments, as will be apparent in light of this disclosure. To this end, the correlation of the various functions shown in FIG. 7 to the specific components illustrated in FIG. 2 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 700. Thus, other embodiments may have fewer or more modules and/or sub-modules depending on the granularity of implementation. Numerous variations and alternative configurations will be apparent in light of this disclosure.

As illustrated in FIG. 7, in one embodiment, method 700 for rocket roll orientation determination, commences, at operation 710, by obtaining a lateral acceleration vector measurement and a velocity vector measurement of the rocket (or a reading from a stored velocity profile), for example at multiple times between launch and impact of the rocket. In some embodiments, the lateral acceleration vector measurement is calculated as a vector sum of data provided by a first lateral acceleration sensor and data provided by a second lateral acceleration sensor, wherein the second sensor measures lateral accelerations in a direction that is orthogonal to those measured by the first sensor. At operation 720, a ratio of the lateral acceleration vector measurement to the velocity vector measurement is calculated to generate an estimated turn rate of the rocket. Next, at operation 730, the estimated turn rate is integrated over a period of time associated with flight of the rocket, to generate a first type of predicted attitude change.

At operation 740, a lateral turn rate vector measurement of the rocket is obtained, for example at multiple times between launch and impact of the rocket. In some embodiments, the lateral turn rate vector measurement is calculated as a vector sum of data provided by a first lateral turn rate sensor and data provided by a second lateral turn rate sensor, wherein the second sensor measures turn rates in a direction that is orthogonal to those measured by the first sensor. At operation 750, the lateral turn rate vector measurement is integrated over the period of time associated with flight of the rocket, to generate a second type of predicted attitude change.

At operation 760, a gravity direction vector is calculated based on a difference between the first type of predicted attitude change and the second type of predicted attitude change. In some embodiments, a ground-pointing orientation angle may then be calculated based on the gravity direction vector. Once the rocket orientation is known, that orientation can be provided to the guidance and control system 104 and used for trajectory shaping and execution of rocket maneuvers, such as turning the rocket towards ground and/or controlling a terminal flight path angle of the guided munition to an intended target. Additionally, such maneuvers may allow for shaping of the rocket's vertical trajectory to extend the maximum range of the rocket.

Example System

Figure 8:
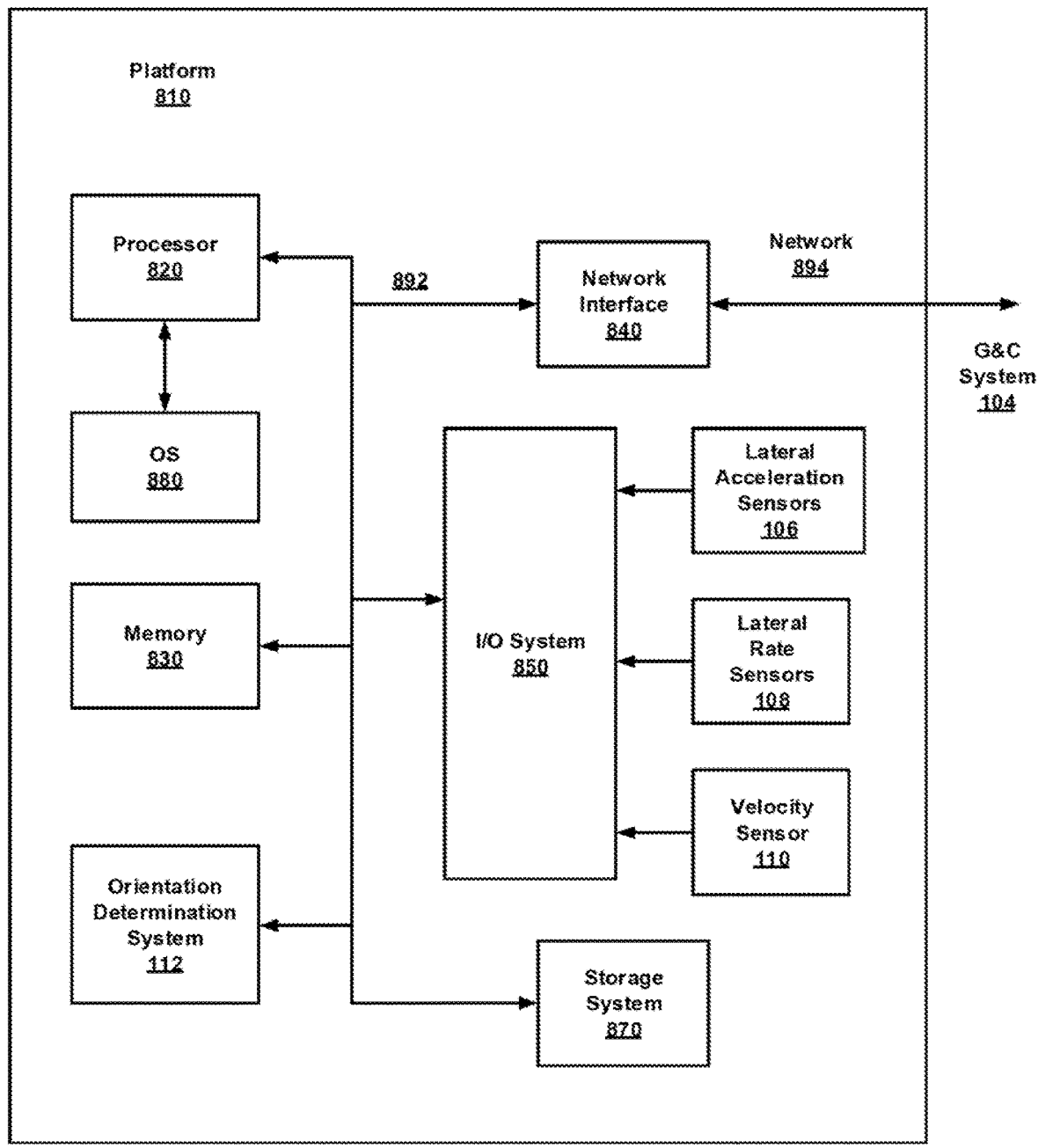
FIG. 8 is a block diagram schematically illustrating a system platform configured to determine a rocket orientation, configured in accordance with certain of the embodiments disclosed herein.

FIG. 8 illustrates an example system 800 configured to determine the orientation (e.g., gravity or downward pointing direction) of a rocket, as described herein. In some embodiments, system 800 comprises a platform 810 which may host, or otherwise be incorporated into a guidance and control module of the rocket.

In some embodiments, platform 810 may comprise any combination of a processor 820, a memory 830, a network interface 840, an input/output (I/O) system 850, lateral acceleration sensors (e.g., accelerometers) 106, lateral rate sensors 108 (e.g., gyroscopes, MEMS sensors), velocity sensor 110, storage system 870, and orientation determination system 112, as described herein. As can be further seen, a bus and/or interconnect 892 is also provided to allow for communication between the various components listed above and/or other components not shown. Platform 810 can be coupled to a network 894 through network interface 840 to allow for communications with other computing systems and platforms on the rocket, or with other ground or air based resources, for example through radio communication. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as, for example, Google Android (Google Inc., Mountain View, Calif.), Microsoft Windows (Microsoft Corp., Redmond, Wash.), Linux, Apple OS X (Apple Inc., Cupertino, Calif.) and/or various real-time operating systems. As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, and/or resources. Wired communication may conform to existing (or yet to be developed) standards, such as, for example, Ethernet. Exemplary wireless networks may include, but are not limited to, satellite networks.

I/O system 850 may be configured to interface between various I/O devices and other components of computer system 800. I/O devices may include, but not be limited to, lateral acceleration sensor 106, lateral rate sensors 108, velocity sensor 110, and other devices not shown such as a test port, keyboard and display element.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Orientation determination system 112 provides estimates of the rocket orientation during flight based on based on measurements of the lateral acceleration and turn rate of the rocket. The rocket orientation estimate can be updated over time with improving accuracy as the rocket travels and maneuvers, in accordance with embodiments of the present disclosure. Orientation determination system 112 may include any or all of the components illustrated in FIG. 2 and described above. Orientation determination system 112 can be implemented or otherwise used in conjunction with a variety of suitable software and/or hardware that is coupled to or that otherwise forms a part of system 800.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the rocket orientation determination methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. The computer software applications disclosed herein may include any number of different modules, sub-modules, or other components of distinct functionality, and can provide information to, or receive information from, still other components. Other componentry and functionality not reflected in the illustrations will be apparent in light of this disclosure, and it will be appreciated that other embodiments are not limited to any particular hardware or software configuration. Thus, in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a processor-implemented method for determination of a guided-munition roll orientation. The method includes calculating a ratio of a lateral acceleration vector measurement of the guided munition to a velocity of the guided munition, to generate an estimated lateral turn rate vector of the guided munition. The method also includes integrating the estimated lateral turn rate vector, over a period of time associated with flight of the guided munition, to generate a first type of predicted attitude change. The method further includes obtaining a lateral turn rate vector measurement of the guided munition; and integrating the measured lateral turn rate vector, over the period of time associated with flight of the guided munition, to generate a second type of predicted attitude change. The method further includes calculating a gravity direction vector based on a difference between the first type of predicted attitude change and the second type of predicted attitude change. In some cases, the method further includes calculating a ground-pointing orientation angle based on the gravity direction vector. In some cases, the lateral acceleration vector measurement is calculated as a vector sum of data provided by a first lateral acceleration sensor and data provided by a second lateral acceleration sensor, the second lateral acceleration sensor orthogonal to the first lateral acceleration sensor. In some such cases the lateral turn rate vector measurement is calculated as a vector sum of data provided by a first lateral turn rate sensor and data provided by a second lateral turn rate sensor, the second lateral turn rate sensor orthogonal to the first lateral turn rate sensor. In some such cases, the first lateral turn rate sensor and the second lateral turn rate sensor comprise at least one of a gyroscope and a micro-electrical-mechanical system. In some cases, the method further includes providing the gravity direction vector to guidance and control circuitry of the guided munition for execution of guided munition maneuvers. In some such cases, the guided munition maneuvers include at least one of turning the guided munition towards ground after launch and controlling a terminal flight path angle of the guided munition. In some cases, the method is carried out on-board the guided munition.

Another example embodiment of the present disclosure provides a system for determination of a guided-munition roll orientation. The system includes an accelerometer configured to measure a lateral acceleration vector of the guided munition. The system also includes a vector division circuit configured to calculate a ratio of the lateral acceleration vector measurement to a velocity of the guided munition, to generate an estimated lateral turn rate vector of the guided munition. The system further includes a temporal integration circuit configured to integrate the estimated lateral turn rate vector, over a period of time associated with flight of the guided munition, to generate a first type of predicted attitude change. The system further includes a lateral turn rate sensor configured to measure a lateral turn rate vector of the guided munition. The temporal integration circuit is further configured to integrate the measured lateral turn rate vector, over the period of time associated with flight of the guided munition, to generate a second type of predicted attitude change. The system further includes a vector subtraction circuit to calculate a gravity direction vector based on a difference between the first type of predicted attitude change and the second type of predicted attitude change. In some cases, the accelerometer further includes a first acceleration sensor and a second acceleration sensor, the second acceleration sensor orthogonal to the first acceleration sensor; and the system further includes a vector addition circuit to calculate the lateral acceleration vector as a sum of data provided by the first acceleration sensor and data provided by the second acceleration sensor. In some cases, the lateral turn rate sensor further comprises a first turn rate sensor and a second turn rate sensor, the second turn rate sensor orthogonal to the first turn rate sensor; and the system further comprises a vector addition circuit to calculate the lateral turn rate vector as a sum of data provided by the first turn rate sensor and data provided by the second turn rate sensor. In some such cases, the first turn rate sensor and the second turn rate sensor comprise at least one of a gyroscope and a micro-electrical-mechanical system. In some cases, the system is further configured to provide the gravity direction vector to a guidance and control circuit of the guided munition to enable execution of guided munition maneuvers. In some such cases, the guided munition maneuvers include at least one of turning the guided munition towards ground after launch and controlling a terminal flight path angle of the guided munition. In some cases, the system is on-board the guided munition.

Yet another example embodiment of the present disclosure provides computer readable storage medium having instructions encoded thereon that, when executed by one or more processors, result in operations for determination of a guided-munition roll orientation. The operations include calculating a ratio of a lateral acceleration vector measurement of the guided munition to a velocity of the guided munition, to generate an estimated lateral turn rate vector of the guided munition. The operations also include integrating the estimated lateral turn rate vector, over a period of time associated with flight of the guided munition, to generate a first type of predicted attitude change. The operations further include obtaining a lateral turn rate vector measurement of the guided munition; and integrating the measured lateral turn rate vector, over the period of time associated with flight of the guided munition, to generate a second type of predicted attitude change. The operations further include calculating a gravity direction vector based on a difference between the first type of predicted attitude change and the second type of predicted attitude change.

In some cases, the operations further include calculating a ground-pointing orientation angle based on the gravity direction vector. In some cases, the lateral acceleration vector measurement is calculated as a vector sum of data provided by a first lateral acceleration sensor and data provided by a second lateral acceleration sensor, the second lateral acceleration sensor orthogonal to the first lateral acceleration sensor. In some such cases the lateral turn rate vector measurement is calculated as a vector sum of data provided by a first lateral turn rate sensor and data provided by a second lateral turn rate sensor, the second lateral turn rate sensor orthogonal to the first lateral turn rate sensor. In some such cases, the first lateral turn rate sensor and the second lateral turn rate sensor comprise at least one of a gyroscope and a micro-electrical-mechanical system. In some cases, the operations further include providing the gravity direction vector to guidance and control circuitry of the guided munition for execution of guided munition maneuvers. In some such cases, the guided munition maneuvers include at least one of turning the guided munition towards ground after launch and controlling a terminal flight path angle of the guided munition. In some cases, the computer readable storage medium is on-board the guided munition.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for determination of a guided munition roll orientation, the method comprising:
    calculating, by a processor-based system, a ratio of a lateral acceleration vector measurement of the guided munition to a velocity of the guided munition, to generate an estimated lateral turn rate vector of the guided munition;
    integrating, by the processor-based system, the estimated lateral turn rate vector, over a period of time that is anytime between launch and impact, to generate a first type of predicted attitude change;
    obtaining, by the processor-based system, a lateral turn rate vector measurement of the guided munition;
    integrating, by the processor-based system, the measured lateral turn rate vector, over the period of time associated with flight of the guided munition, to generate a second type of predicted attitude change;
    calculating, by the processor-based system, a gravity direction vector based on a difference between the first type of predicted attitude change and the second type of predicted attitude change; and
    providing the gravity direction vector to a guidance and control system of the guided munition for execution of guided munition maneuvers.

2. The method of claim 1, further comprising calculating a ground-pointing orientation angle based on the gravity direction vector.

3. The method of claim 1, wherein the lateral acceleration vector measurement is calculated as a vector sum of data provided by a first lateral acceleration sensor and data provided by a second lateral acceleration sensor, the second lateral acceleration sensor orthogonal to the first lateral acceleration sensor; and the lateral turn rate vector measurement is calculated as a vector sum of data provided by a first lateral turn rate sensor and data provided by a second lateral turn rate sensor, the second lateral turn rate sensor orthogonal to the first lateral turn rate sensor.

4. The method of claim 3, wherein the first lateral turn rate sensor and the second lateral turn rate sensor comprise at least one of a gyroscope and a micro-electrical-mechanical system.

5. The method of claim 1, wherein the guided munition maneuvers comprise at least one of turning the guided munition towards ground after launch and controlling a terminal flight path angle of the guided munition.

6. The method of claim 1, wherein the method is carried out on-board the guided munition.

7. A system for determination of a guided munition orientation, the system comprising:
    an accelerometer configured to measure a lateral acceleration vector of the guided munition, wherein the accelerometer comprises a first acceleration sensor and a second acceleration sensor, the second acceleration sensor being orthogonal to the first acceleration sensor;
    a vector addition circuit configured to calculate the lateral acceleration vector as a sum of data provided by the first acceleration sensor and data provided by the second acceleration sensor;
    a vector division circuit configured to calculate a ratio of the lateral acceleration vector measurement to a velocity of the guided munition, to generate an estimated lateral turn rate vector of the guided munition;
    a temporal integration circuit configured to integrate the estimated lateral turn rate vector, over a period of time that is anytime between launch and impact, to generate a first type of predicted attitude change;
    a lateral turn rate sensor configured to measure a lateral turn rate vector of the guided munition; wherein the lateral turn rate sensor comprises a first turn rate sensor and a second turn rate sensor, the second turn rate sensor orthogonal to the first turn rate sensor; and wherein the vector addition circuit is configured to calculate the lateral turn rate vector as a sum of data provided by the first turn rate sensor and data provided by the second turn rate sensor;
    the temporal integration circuit is further configured to integrate the measured lateral turn rate vector, over the period of time associated with flight of the guided munition, to generate a second type of predicted attitude change; and
    a vector subtraction circuit configured to calculate a gravity direction vector based on a difference between the first type of predicted attitude change and the second type of predicted attitude change.

8. The system of claim 7, wherein the first turn rate sensor and the second turn rate sensor comprise at least one of a gyroscope and a micro-electrical-mechanical system.

9. The system of claim 7, wherein the system is further configured to provide the gravity direction vector to a guidance and control circuit of the guided munition to enable execution of guided munition maneuvers.

10. The system of claim 9, wherein the guided munition maneuvers comprise at least one of turning the guided munition towards ground after launch and controlling a terminal flight path angle of the guided munition.

11. The system of claim 7, wherein the system is on-board the guided munition.

12. At least one non-transitory computer readable storage medium having instructions encoded thereon that, when executed by one or more processors, result in the following operations for determination of a guided munition orientation, the operations comprising:
    calculating a ratio of a lateral acceleration vector measurement of the guided munition to a velocity of the guided munition, to generate an estimated lateral turn rate vector of the guided munition;
    integrating the estimated lateral turn rate vector, over a period of time associated with flight of the guided munition, to generate a first type of predicted attitude change;
    obtaining a lateral turn rate vector measurement of the guided munition;
    integrating the measured lateral turn rate vector, over the period of time that is anytime between launch and impact, to generate a second type of predicted attitude change; and
    calculating a gravity direction vector based on a difference between the first type of predicted attitude change and the second type of predicted attitude change.

13. The computer readable storage medium of claim 12, the operations further comprising calculating a ground-pointing orientation angle based on the gravity direction vector.

14. The computer readable storage medium of claim 12, wherein the lateral acceleration vector measurement is calculated as a vector sum of data provided by a first lateral acceleration sensor and data provided by a second lateral acceleration sensor, the second lateral acceleration sensor orthogonal to the first lateral acceleration sensor; and the lateral turn rate vector measurement is calculated as a vector sum of data provided by a first lateral turn rate sensor and data provided by a second lateral turn rate sensor, the second lateral turn rate sensor orthogonal to the first lateral turn rate sensor.

15. The computer readable storage medium of claim 14, wherein the first lateral turn rate sensor and the second lateral turn rate sensor comprise at least one of a gyroscope and a micro-electrical-mechanical system.

16. The computer readable storage medium of claim 12, the operations further comprising providing the gravity direction vector to guidance and control circuitry of the guided munition for execution of guided munition maneuvers, wherein the guided munition maneuvers comprise at least one of turning the guided munition towards ground after launch and controlling a terminal flight path angle of the guided munition.

17. The computer readable storage medium of claim 12, wherein the computer readable storage medium is on-board the guided munition.

\* \* \* \* \*